Figure 1:
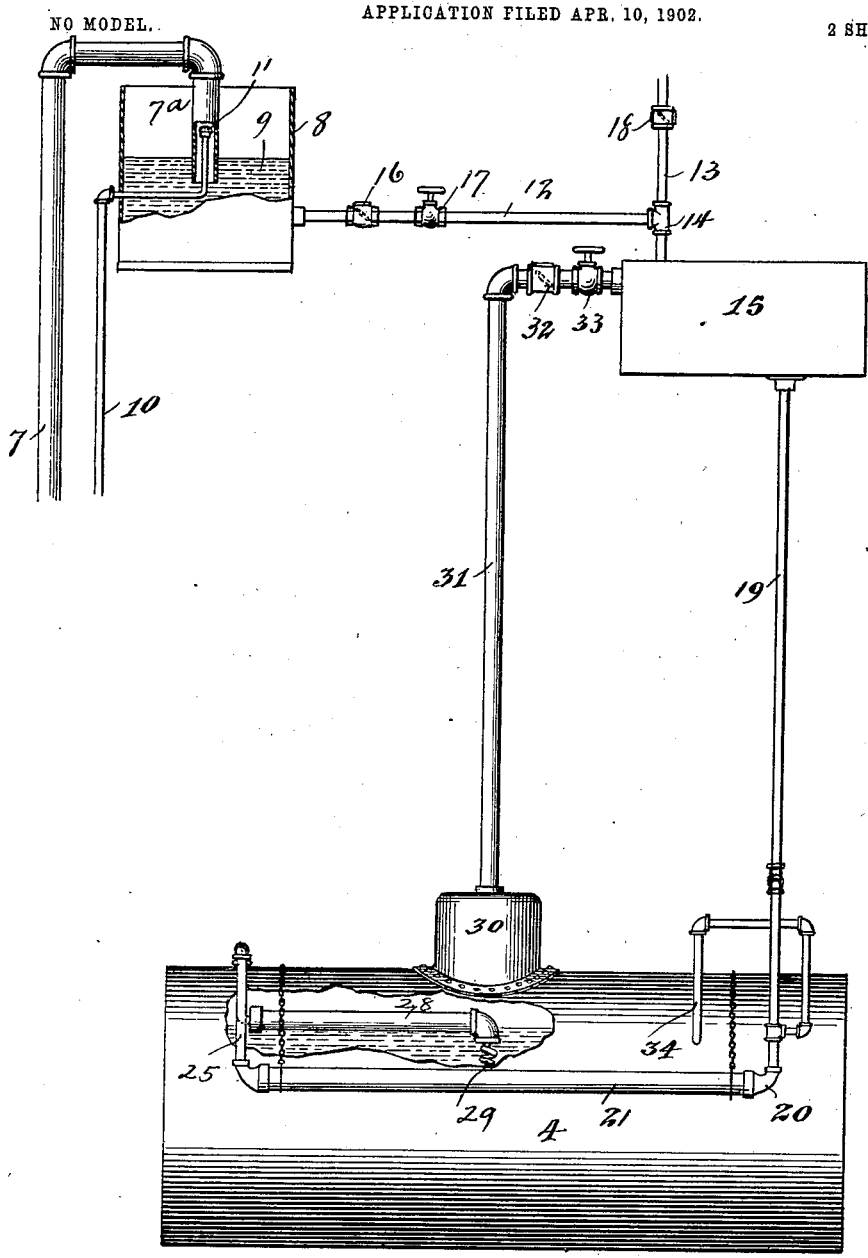

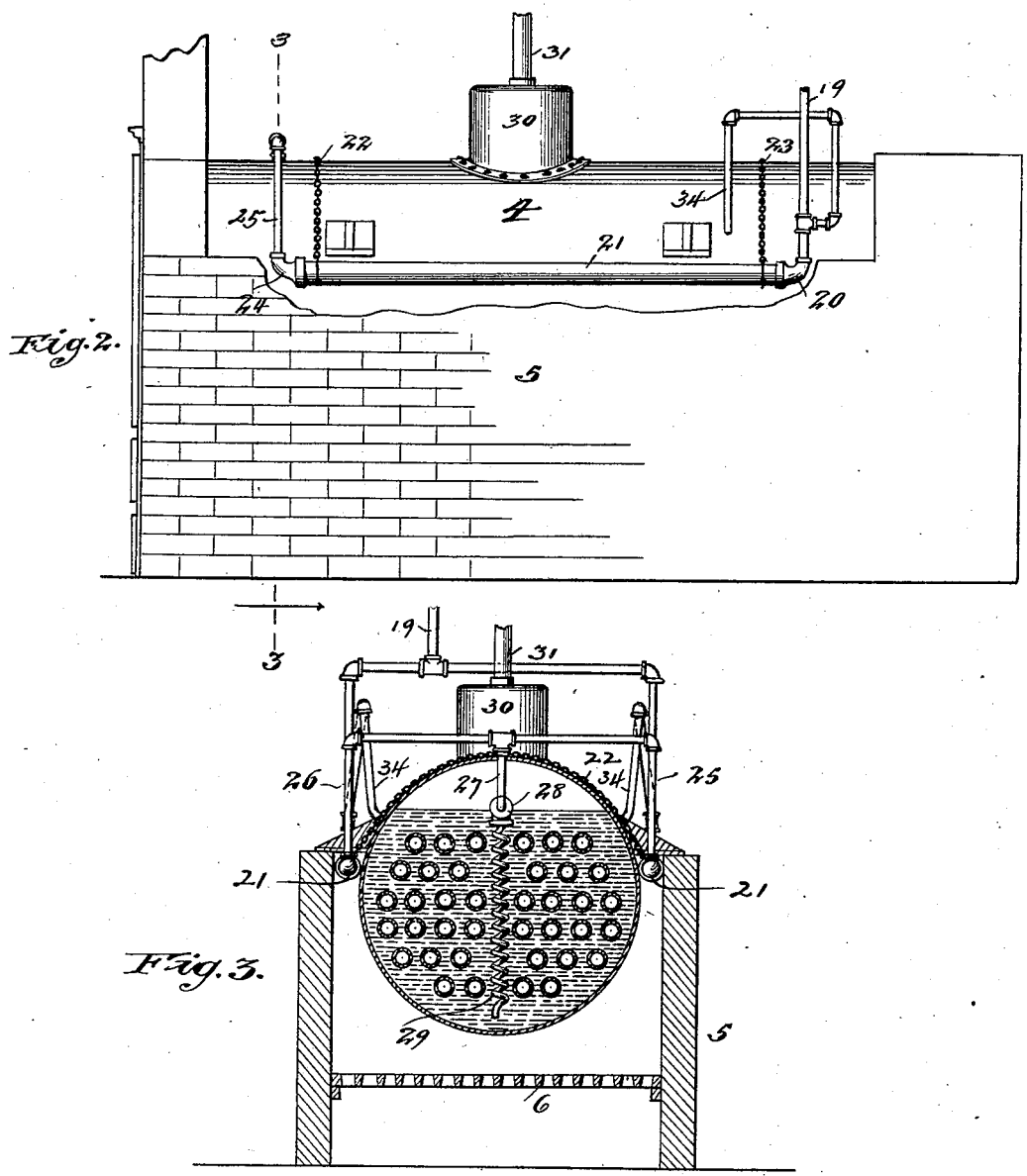

No. 730,660. Patented June 9, 1903.

UNITED STATES PATENT OFFICE.

WILLIAM IRVING, OF CHICAGO, ILLINOIS.

FEED-WATER HEATER.

SPECIFICATION forming part of Letters Patent No. 730,660, dated June 9, 1903.

Application filed April 10, 1902. Serial No. 102,148. (No model.)

*To all whom it may concern:*

Be it known that I, WILLIAM IRVING, a citizen of the United States, residing at Chicago, in the county of Cook and State of Illinois, have invented certain new and useful Improvements in Feed-Water Heaters for Steam-Boilers, of which the following is a specification.

My invention relates to devices for heating the water supplied to steam-boilers for the generation of steam, and my invention has reference more particularly to a novel device for heating condensed exhaust which is to be returned to the boiler.

The principal object of my invention is to effect an economy in the operation of steam heating and power plants, wherein the exhaust-steam is condensed and resupplied to the boiler by effecting an initial heating of the feed-water prior to its readmission to the boiler, utilizing for this purpose a portion of the heat generated in and given out by the fire-box, which ordinarily is wasted.

In carrying out my invention I conduct the pipe or pipes that convey the condensed exhaust back to the boiler through the upper portion of the fire-box on either or both sides of the boiler, where they are subjected to a high heat, thus providing for the admission of the water to the boiler at a temperature at which the water is readily converted into steam-vapor with the application of but slight additional heat.

In the accompanying drawings, Figure 1 is a side elevational view in the nature of a diagram illustrating my invention and the manner of applying the same to a steam-boiler. Fig. 2 is a side elevational view of a boiler and boiler-setting, illustrating the relative location of the reheating-pipes; and Fig. 3 is a cross-sectional view of the parts shown in Fig. 2 viewed in the direction indicated by the arrow.

In the drawings, 4 indicates a steam-boiler, and 5 the boiler-setting containing the grate 6 and constituting the fire-chamber.

7 indicates a pipe through which exhaust or spent steam from an engine or a heating plant is returned to the vicinity of the boiler. This pipe terminates in a downwardly-bent end $7^a$, which enters the upper open end of a condenser tank 8, this latter being partially filled with a body of water 9.

10 indicates a small pipe for delivering cold water, the upper portion of which is carried through the wall of the condenser-tank 8 and has an upturned end portion terminating in a jet-nozzle 11, located within the hollow of the depending portion of the elbow of the exhaust-steam pipe 7. From the condenser-tank 8 a connection is made by a pipe 12, a vent-pipe 13, and a T connection 14 to a reservoir 15. The pipe 12 contains an ordinary check-valve 16 and a globe-valve 17, the vent-pipe 13 being likewise provided with a check-valve 18.

The bottom of the reservoir 15 is tapped by a vertical pipe 19, leading downwardly to the boiler 4, which pipe just above the boiler is preferably split to lead to either side thereof, the lower ends of the forks of this pipe entering elbows 20, the opposite ends of which elbows are connected with a pair of horizontally-disposed pipes 21 of considerably enlarged diameter as compared with the delivery-pipe 19. These pipes 21 (see Figs. 2 and 3) are located on either side of and adjacent the boiler 4, lying in the top of the fire-box between the adjacent sides of the boiler and the inner walls of the boiler-setting. The pipes 21 are preferably suspended in the position shown by a pair of chains 22 and 23, slung over the boiler at either end thereof, as best shown in Fig. 3. The forward ends of the pipes 21 enter elbows 24, which latter communicate by a pair of elbow-pipes 25 and 26 with a pipe 27, which taps the boiler near its forward end, communicating inside the latter with an enlarged pipe 28, extending horizontally just above the water-level, the inner end of which pipe 28 terminates in a coil 29, formed of pipe of relatively small diameter and opening at the lowest point of the boiler. The dome 30 of the boiler has connected therewith a vertical steam-pipe 31, which is provided with suitable check and globe valves 32 and 33, respectively, and taps the reservoir 15 at the upper portion at one end thereof.

The operation of the device above described is as follows: Exhaust-steam entering the condenser 8 by the pipe 7 is condensed by the supply of cold water issuing through the jet-nozzle 11 and settles in liquid form in said tank, whence it flows by gravity through the pipes 12 and 13 into the reservoir 15. In this reservoir the water is subjected to a pressure equal to the boiler-pressure by means of steam admitted through the pipe 31, which forces the water downwardly through the pipe 19, thence through the pipes 21 on either side of the boiler, and thence through the pipes 25 26 27 28 and pipe-coil 29 into the boiler at the lowest point therein. The pipes 21, lying as they do within the fire-box, are subjected to an intense heat, and consequently the return-water passing therethrough becomes superheated and enters the boiler at a high temperature, thus lessening the time and heat required to convert said water when once introduced to the boiler into the form of steam. It will be observed that these pipes are so located as to abstract from the fire-chamber and utilize only a portion of the heat generated by the fuel that ordinarily goes to waste through the chimney or through the walls of the fire-chamber.

Owing to the intense heat to which the pipes are subjected it becomes necessary to provide means for maintaining a constant water circulation therethrough in order to prevent cracking, bending, and other injury to the pipes, since there may be times while the boiler is in operation when the supply of condensed exhaust may be interrupted, the exhaust being utilized for other purposes. I therefore make the pipes 21 part of a water-circulation system, such as is frequently applied to steam-boilers. To do this, I tap the boiler on either side thereof by a pipe 34, which pipe at its opposite end taps the delivery-pipe 19, preferably just above the point at which the latter enters the fire-box. The suction produced by the feed-water passing through pipe 19 will be sufficient to induce a circulation through the pipes 20 21 25 and 26 27 28 29 and the interior of the boiler, and should the feed of water through the pipe 19 at any time be intermitted the difference in temperature and specific gravity between the water at the top and at the bottom of the boiler will suffice to maintain this circulation in a manner well understood, thus keeping the pipes 21 constantly filled with water, and hence at a temperature which will not injure or destroy said pipes.

I make no claim herein to the form of condenser herein shown and described, since this latter constitutes the subject-matter of a companion application filed by me on the 1st day of August, 1901, Serial No. 70,505.

My invention is not limited, except to the extent indicated in certain of the appended claims, to the specific location herein shown and described of the return-pipes 21, it being necessary for the purposes of my invention only that said pipes be located somewhere within the fire-box where they are subjected to the action of heat that is otherwise allowed to go unutilized.

It will also be obvious that my invention is not limited in its use to the return of condensed exhaust to the boiler, since it is equally advantageous for the purposes of introducing feed-water that has not already passed through the boiler. The invention has, however, been more particularly designed for use in connection with condensed exhaust, especially in connection with a condenser of the type herein shown, which forms the subject-matter of my earlier application above referred to.

I claim—

1. The combination with a boiler, of a reservoir for feed-water, a steam-pipe leading thereto from the boiler, a feed-water delivery-pipe leading therefrom to the boiler, said delivery-pipe extending through the fire-box and discharging thence into the lower portion of the boiler, and a water-circulation pipe tapping the upper portion of the boiler and at its other end communicating with said feed-water delivery-pipe, substantially as described.

2. The combination with a steam-boiler, of a feed-water pipe entering the upper portion of the boiler, extending therein horizontally for some distance, and terminating in a coil formed of pipe of relatively small diameter and opening at the lowest point of the boiler, substantially as described.

3. The combination with a boiler, of a reservoir for feed-water, a steam-pipe leading thereto from the boiler, a feed-water delivery-pipe leading therefrom to the boiler, said delivery-pipe being divided and extending through the upper portion of the fire-box on either side of the boiler, and water-circulation pipes tapping the boiler just below the normal level of the water therein and at their other ends communicating with the branches of said feed-water delivery-pipe, substantially as described.

WILLIAM IRVING.

Witnesses:
FREDERICK C. GOODWIN,
SAMUEL N. POND.